(12) United States Patent
Tanaka

(10) Patent No.: US 7,515,191 B2
(45) Date of Patent: Apr. 7, 2009

(54) DIGITAL CAMERA AND SOLID-STATE IMAGE PICKUP UNIT

(75) Inventor: Seiji Tanaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 760 days.

(21) Appl. No.: 10/912,064

(22) Filed: Aug. 6, 2004

(65) Prior Publication Data

US 2005/0057661 A1 Mar. 17, 2005

(30) Foreign Application Priority Data

Aug. 12, 2003 (JP) .............................. 2003-292269

(51) Int. Cl.
*H04N 5/228* (2006.01)
*H04N 5/222* (2006.01)

(52) U.S. Cl. .............................. 348/333.04; 348/208.2; 348/208.13

(58) Field of Classification Search ............ 348/208.99, 348/208.1–7, 239, 241, 248, 333.01–333.04, 348/333.11
See application file for complete search history.

(56) References Cited

U.S. PATENT DOCUMENTS

| | | | | |
|---|---|---|---|---|
| 5,608,703 A | * | 3/1997 | Washisu | 348/208.7 |
| 5,959,666 A | * | 9/1999 | Naganuma | 348/208.3 |
| 6,429,895 B1 | * | 8/2002 | Onuki | 348/208.99 |

FOREIGN PATENT DOCUMENTS

JP 5-52837 U 7/1993

* cited by examiner

*Primary Examiner*—Sinh N Tran
*Assistant Examiner*—Daniel M Pasiewicz
(74) *Attorney, Agent, or Firm*—Birch, Stewart, Kolasch & Birch, LLP

(57) ABSTRACT

A digital camera comprising: a solid-state image pickup device having an image pickup region; a signal processing unit for generating a through-image on a basis of an image signal read from a region extracted from a through-image extraction frame of said image pickup region; a display unit for displaying said through-image generated by said signal processing unit; a camera shake detection unit for detecting an amount of camera shake; and a control unit for calculating an amount of displacement by amplifying said amount of camera shake detected by said camera shake detection unit and shifting said through-image extraction frame on a basis of said amount of displacement.

15 Claims, 4 Drawing Sheets

DIGITAL CAMERA AND SOLID-STATE IMAGE PICKUP UNIT

This Nonprovisional application claims priority under 35 U.S.C. § 119(a) on Patent Application No(s). 2003-292269 filed in Japan on Aug. 12, 2003, the entire contents of which are hereby incorporated by reference.

FIELD OF THE INVENTION

The present invention relates to a digital camera such as a digital still camera, a digital video camera, etc. and particularly to a digital camera and a solid-state image pickup unit in which a photographer can recognize intuitively the degree of camera shake.

BACKGROUND OF THE INVENTION

For example, as described in Japanese Utility Model Laid-Open No. 52837/1993, some camera has a function of giving a warning of camera shake. In this background art, a predetermined warning pattern displayed on a liquid crystal display portion is moved left and right by every two bits to thereby warn the photographer as to whether camera shake is apt to occur.

SUMMARY OF THE INVENTION

In the background art, there is a problem that the photographer cannot grasp intuitively the degree of camera shake in a state in which the photographer holds the camera in his or her hands because the predetermined warning pattern is merely displayed to warn the photographer.

A digital camera has a display portion for displaying an image. Generally, the photographer takes a picture in the condition that the photographer uses the display portion in place of an electronic view-finder while a moving image obtained from a solid-state image pickup device is displayed as a through-image on the display portion. Accordingly, when camera shake occurs, the occurrence of camera shake can be recognized visually from the through-image on the display portion without display of the predetermined warning pattern on the display portion. Moreover, the degree of camera shake can be grasped intuitively from the degree of blurring of the through-image.

Although increase in number of pixels in the solid-state image pickup device used in the digital camera has advanced recently, there is a limit to the display area of the display portion because of limitation in size of the camera housing. Accordingly, there is a problem that the occurrence of camera shake and the degree of camera shake cannot be recognized visually from a blurred image displayed on the display portion because the through-image is generated and displayed on the display portion in such a manner that a high-definition image obtained from the solid-state image pickup device is thinned down for the display portion having a small area.

Moreover, because the recent digital camera has a solid-state image pickup device capable of picking up a high-definition image, the digital camera may be formed so that the resolution of an image to be picked up can be selected optionally by the user. In addition, because the recent digital camera has a zoom lens, the digital camera may be formed so that an image can be selected optionally from images widely different in magnification in a range of from an enlarged image to a reduced image.

Although the degree of camera shake when the photographer holds the digital camera in his or her hands depends on the resolution and the magnification, the degree of camera shake in accordance with the resolution cannot be grasped intuitively by the photographer if nothing is done except that the through-image obtained by reducing a high-definition image is displayed on the small display portion. If the through-image is displayed on the display portion while shaken largely in accordance with the zoom ratio when the zoom ratio is high, the feeling of camera shake varies widely according to the zoom ratio to thereby give a sense of incompatibility to the photographer.

An object of the invention is to provide a digital camera and a solid-state image pickup unit in which the degree of camera shake can be grasped intuitively from a through-image displayed on a display portion.

Another object of the invention is to provide a digital camera and a solid-state image pickup unit in which the degree of camera shake can be grasped intuitively in accordance with resolution.

A further object of the invention is to provide a digital camera and a solid-state image pickup unit in which an image can be picked up with a constant sense of camera shake regardless of zoom ratio.

The invention provides a digital camera including a solid-state image pickup device having an image pickup region, a signal processing unit for generating a through-image on the basis of an image signal read from a region extracted from a through-image extraction frame of the image pickup region, a display unit for displaying the through-image generated by the signal processing unit, a camera shake detection unit for detecting an amount of camera shake, and a control unit for calculating an amount of displacement by amplifying the amount of camera shake detected by the camera shake detection unit and shifting the through-image extraction frame on the basis of the amount of displacement.

According to this configuration, a photographer can grasp the degree of camera shake intuitively from the through-image displayed on the display unit.

Preferably, in the digital camera according to the invention, the control unit corrects the amount of displacement in accordance with a zoom ratio of a zoom lens provided in front of the solid-state image pickup device. According to this configuration, the degree of camera shake corresponding to the zoom ratio can be confirmed on a display screen of the display unit, so that the degree of camera shake to be suppressed can be judged easily.

Preferably, in the digital camera according to the invention, the control unit corrects the amount of displacement so that the amount of correction decreases as the zoom ratio increases. According to this configuration, the through-image can be prevented from being blurred largely on the display screen of the display unit even in the case where an enlarged image is picked up, so that a sense of incompatibility in the feeling of camera shake is not given to the photographer.

Preferably, in the digital camera according to the invention, the control unit corrects the amount of displacement so that the amount of displacement is kept constant regardless of the zoom ratio. According to this configuration, the amplitude of the through-image can be kept constant regardless of the zoom ratio, so that camera shake can be confirmed with the same amplitude.

Preferably, in the digital camera according to the invention, the control unit corrects the amount of displacement in accordance with the number of recording pixels. According to this configuration, the degree of camera shake corresponding to resolution can be judged easily from the through-image.

Preferably, in the digital camera according to the invention, the control unit corrects the amount of displacement so that the amount of displacement decreases as the number of recording pixels decreases. According to this configuration, the photographer can pick up a subject without paying much attention to camera shake in the case of low resolution small in the influence of camera shake.

Preferably, in the digital camera according to the invention, the control unit corrects the amount of displacement by amplification before the amount of camera shake exceeds a predetermined threshold but corrects the amount of displacement by damping after the amount of camera shake exceeds the predetermined threshold. According to this configuration, the state of camera shake is displayed on the display screen while amplified when the camera shake is small. On the other hand, when the camera shake is large, large blurring of the through-image on the display screen can be prevented. Accordingly, camera shake can be checked easily.

Preferably, in the digital camera according to the invention, the control unit sets the predetermined threshold in accordance with a zoom ratio of a zoom lens provided in front of the solid-state image pickup device. According to this configuration, camera shake can be checked easily in the same manner as described above even in the case where the zoom ratio changes.

The invention also provides a solid-state image pickup unit including a solid-state image pickup device defined as described above, and a control unit defined as described above, wherein the solid-state image pickup device and the control unit are formed on one chip. According to this configuration, when the solid-state image pickup unit is mounted in a digital camera, the digital camera can be formed so that the state of camera shake can be checked easily and intuitively.

According to the invention, the degree of camera shake can be grasped intuitively from the through-image displayed on the display unit. Moreover, according to the invention, the degree of camera shake corresponding to resolution can be grasped easily and intuitively from viewing the through-image displayed on the display unit. In addition, according to the invention, images can be picked up with a constant feeling of camera shake regardless of the zoom ratio.

DESCRIPTION OF REFERENCE NUMERALS

1: zoom lens
2: solid-state image pickup device (CCD)
3: acceleration sensor
4: signal processing portion
5: display portion
10: amplitude control portion

DETAILED DESCRIPTION OF THE INVENTION

An embodiment of the invention will be described below with reference to the drawings.

Figure 1:
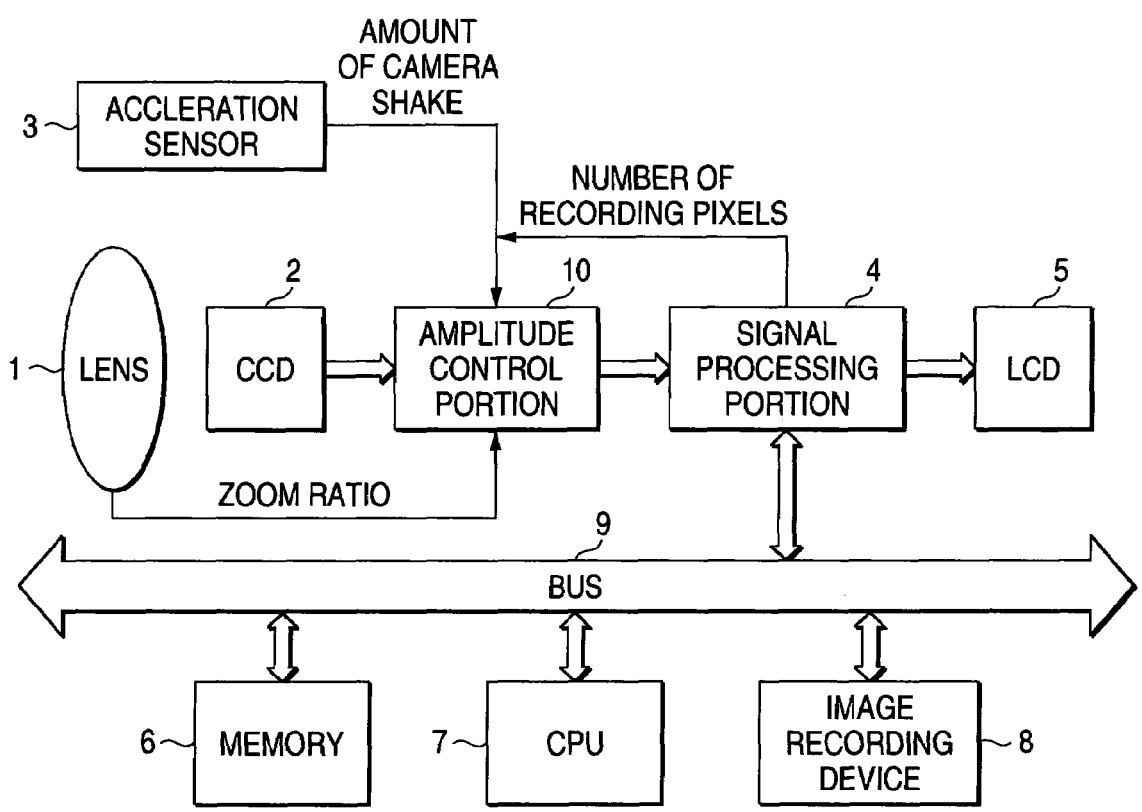
[FIG. 1] It is a block diagram of the configuration of a digital camera according to an embodiment of the invention.

FIG. 1 is a block diagram of the configuration of a digital camera according to an embodiment of the invention. Although the digital camera according to this embodiment is a digital still camera, the invention may be also applied to a digital video camera or a digital camera mounted in a portable phone.

This digital camera includes a zoom lens 1 for forming an optical image of a subject, a solid-state image pickup device 2 provided in the rear of the zoom lens 1 for converting the optical image of the subject into an electric signal, and an acceleration sensor 3 for detecting camera shake. Although this embodiment shows the case where a CCD is used as the solid-state image pickup device 2, another type solid-state image pickup device such as a CMOS image sensor may be used instead.

The digital camera further includes a known signal processing portion 4 for processing an image signal output from the CCD 2, a display portion 5 (liquid crystal display portion LCD in this embodiment) mounted in the rear of the camera for displaying a through-image or an image already picked up, a main memory 6, a CPU 7 for generally controlling the digital camera, an image recording device 8 for recording a picked-up still or moving image in an external memory, and a bus 9 for connecting these constituent components to one another.

The digital camera according to this embodiment further includes an amplitude control portion 10 provided between the CCD 2 and the signal processing portion 4. A detection signal output from the acceleration sensor 3, zoom ratio data output from the zoom lens 1 and recording pixel number data output from the signal processing portion 4 are input into the amplitude control portion 10. Incidentally, the solid-state image pickup device 2, the signal processing portion 4 and the amplitude control portion 10 may be preferably formed on one chip as a solid-state image pickup unit.

When a zoom command is given from the photographer holding the digital camera, the CPU 7 issues a command signal to a drive portion (not shown) of the zoom lens 1 to drive the zoom lens 1 to obtain a zoom ratio corresponding to the command signal and supplies data of the zoom ratio to the amplitude control portion 10.

When a command indicating the number of recording pixels is given from a manual operation command input portion not shown, the CPU 7 sends data of the number of recording pixels to the signal processing portion 4. Assume now that the number of recording pixels can be selected from two types, namely, 1280 by 960 and 640 by 480. The photographer selects one from the two types. The signal processing portion 4 fetches the image signal read from the CCD 2 and generates an image signal having the number of recording pixels selected by the photographer.

The digital camera is formed so that the image signal read from the CCD 2 and processed by the signal processing portion 4 is stored in an external memory by the image recording device 8 when the photographer pushes down a shutter button not shown. Even before the shutter button is pushed down, the image signal is read from the CCD 2 at predetermined time intervals, for example, of 30 frames per second and displayed as a through-image on the display portion 5. The photographer can decide compositional arrangement of the subject by viewing the through-image displayed on the display portion 5.

For example, the display portion 5 has a small size of 400 by 300 pixels. For this reason, the image output from the CCD 2 must be reduced when the through-image is displayed on the display portion 5. Therefore, in addition to the number of recording pixels, the signal processing portion 4 thins down the image signal read from the CCD 2 and supplies the thinned image signal to the display portion 5 for the purpose of displaying the through-image.

When the through-image is displayed, the amplitude control portion 10 shakes the image displayed on the display portion 5 to express the presence of camera shake on the display image by operating as follows.

Figure 2:
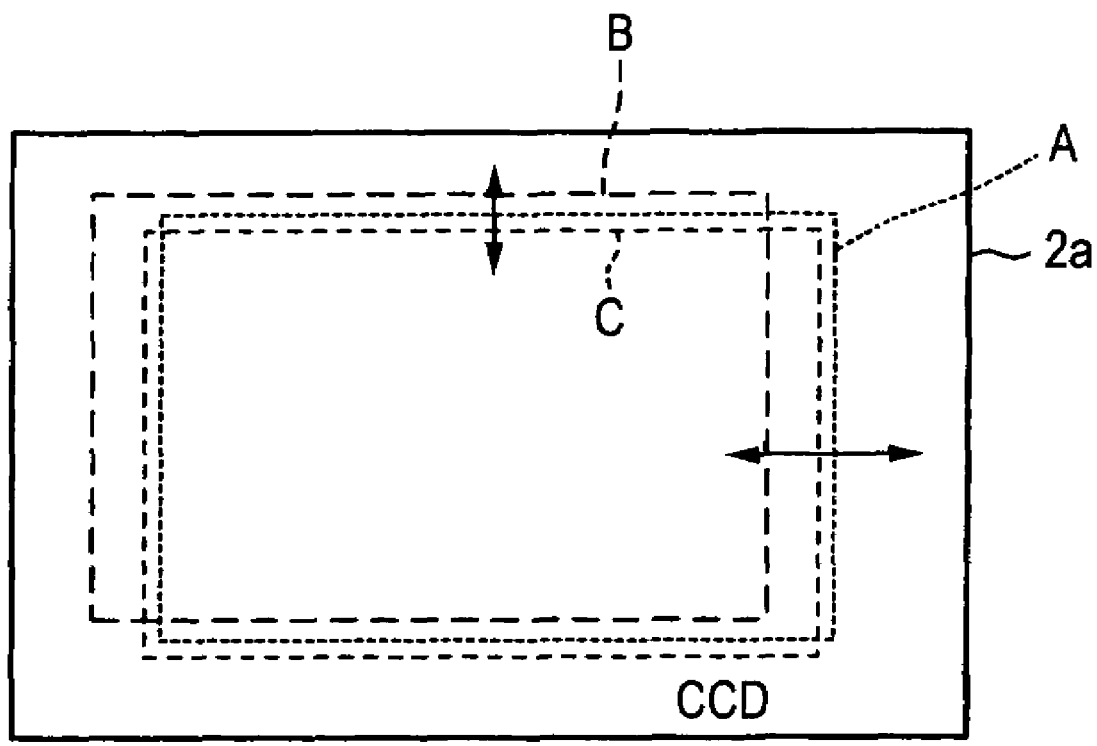
[FIG. 2] It is a frontal typical view showing an image pickup region on a surface of a solid-state image pickup device depicted in FIG. 1.

FIG. 2 is a typical view showing a surface of the CCD 2. Assume that the image pickup region of the CCD 2 is represented by a solid-line frame 2a shown in FIG. 2. As a result of the aforementioned thinning process, an image signal corresponding to a portion extracted by an extraction frame A in the image pickup region 2a is displayed as a through-image on the display portion 5.

When camera shake occurs, the image in the extraction frame A is blurred according to the camera shake. The blurring of the image in the extraction frame A according to the camera shake however becomes small because the number of pixels in the display portion 5 is remarkably smaller than the number of pixels in the CCD 2. Accordingly, the blurring of the through-image in accordance with the camera shake can hardly be recognized visually even in the case where the though-image displayed on the display portion 5 is viewed.

Therefore, in this embodiment, when camera shake is detected, the through-image extracted from the extraction frame A shown in FIG. 2 is displayed on the display portion 5, a through-image extracted from an extraction frame B positionally displaced from the extraction frame A is then displayed on the display portion 5 at next display timing, and a through-image extracted from an extraction frame C is then displayed on the display portion 5 at further next display timing.

Moreover, the amount of displacement in each of the extraction frames A, B, C, . . . is amplified so that the amplified amount of displacement is set to be larger than actual camera shake amplitude t (e.g., n times larger than the camera shake amplitude t). Accordingly, the through-image is displayed on the display portion 5 in a state in which blurring of the through-image can be recognized visually, so that the photographer can grasp the degree of camera shake intuitively.

As described above, the influence of the degree of camera shake on the picked-up image varies according to the number of recording pixels and the zoom ratio. Therefore, in this embodiment, the amplitude of the through-image is controlled to be changed depending on the number of recording pixels and the zoom ratio.

Figure 3:
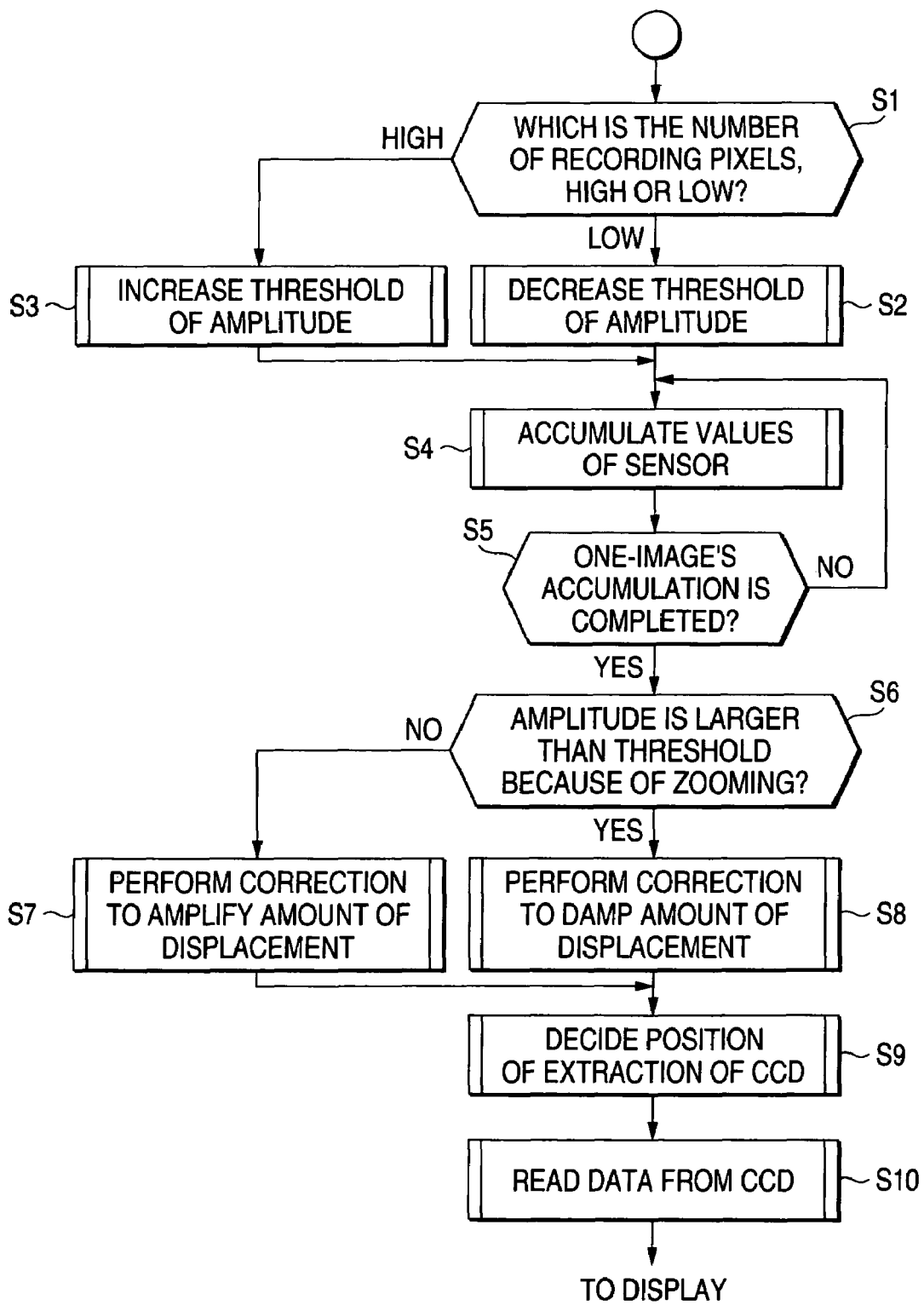
[FIG. 3] It is a flow chart showing a procedure for a control program executed by an amplitude control portion depicted in FIG. 1.

FIG. 3 is a flow chart of a control program showing a procedure for controlling the amplitude of the through-image in accordance with the number of recording pixels and the zoom ratio. The control program is executed by the amplitude control portion 10 shown in FIG. 1 at every through-image display timing.

First, in step S1, the amplitude control portion 10 judges which is resolution (the number of recording pixels), low (640 by 480 pixels in this embodiment) or high (1280 by 960 pixels in this embodiment). When the resolution is low, the threshold T of the amplitude is decreased by a predetermined value (step S2) and the current position of the routine goes to step S4. When the resolution is high, the threshold T of the amplitude is increased by a predetermined value (step S3) and the current position of the routine goes to step S4.

In step S4, the detection signal output from the acceleration sensor 3 is fetched and accumulated. In step S5, a judgment is made as to whether one-scene's accumulation is completed or not. When one-scene's accumulation is not completed, the current position of the routine goes back to the step S4 to continue the accumulation.

When the accumulation of the detection signal output from the acceleration sensor 3 is completed, the current position of the routine then goes to step S6. In step S6, a judgment is made by the zoom ratio data fetched from the zoom lens 1 as to whether the actual camera shake amplitude, that is, the accumulated value of the acceleration sensor is larger than the threshold $\alpha T$ amplified by the zoom ratio $\alpha$ or not.

When the judgment results in NO, that is, when the actual camera shake amplitude is smaller than the threshold $\alpha T$, the current position of the routine goes to step S7. In step S7, the amount of displacement (n times as large as the actual camera shake amplitude t in this embodiment) in each of the extraction frames B, C, . . . set according to the actual camera shake amplitude) is multiplied by a correction coefficient so as to be amplified. Then, the current position of the routine goes to step S9.

When the judgment in step S6 results in YES, that is, when the actual camera shake amplitude is not smaller than the threshold $\alpha T$, the current position of the routine goes to step S8. In step S8, the amount of displacement of the extraction frame set in accordance with the actual camera shake amplitude is multiplied by a correction coefficient so as to be damped. Then, the current position of the routine goes to step S9.

In step S9, the position of the extraction frame corrected so as to be amplified or damped by the step S7 or S8 is decided. Then, in step S10, an image signal in the extraction frame is read and delivered to the signal processing portion 4 so that the image signal is displayed as a through-image on the display portion 5.

Figure 4:
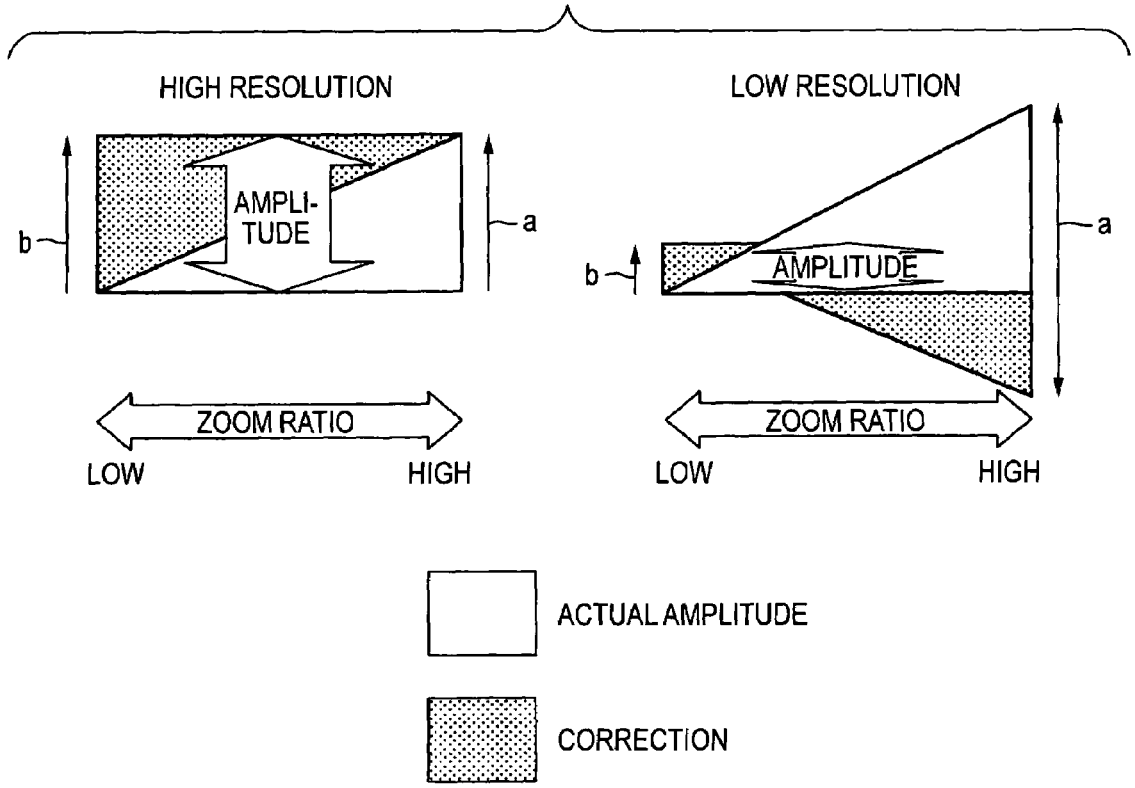
[FIG. 4] It is a view for explaining a result of execution of the procedure depicted in FIG. 3.

FIG. 4 is a view for explaining a result of the aforementioned control. In this embodiment, the position of the through-image extraction frame is decided on the basis of the amount of displacement calculated by amplifying the camera shake amplitude in order to make it easy to visually recognize the state of camera shake. The amplification is made in such a manner that the amplitude is multiplied by a correction b in the same direction as the actual shake direction a so that camera shake can be checked even in a scale-down zoom mode (low zoom ratio).

As the zoom ratio increases, camera shake can be checked even on the basis of the actual camera shake amplitude so that the size of the correction b is reduced with the result that the amplitude approaches a value corresponding to the actual camera shake amplitude. In the example shown in FIG. 4, the amplitude is multiplied by a correction coefficient in the step S7 or S8 so that the same amount of shake (the same amount of displacement of the extraction frame) can be obtained for the same resolution (number of recording pixels) regardless of the zoom ratio. As a result, camera shake can be checked in a constant sense of camera shake regardless of the zoom ratio.

When the number of recording pixels (resolution) is changed by re-sizing with the angle of view unchanged, a high-resolution image is easily affected by camera shake but a low-resolution image is hardly affected by camera shake. Therefore, the amplitude is multiplied by a correction so that the amount of displacement of the extraction frame in low resolution becomes smaller than the amount of displacement of the extraction frame in high resolution. That is, the amount of displacement of the extraction frame is corrected in accordance with the influence of actual camera shake on the picked-up image.

In this embodiment, the correction is performed as follows. Before the actual camera shake amplitude exceeds the threshold $\alpha T$, amplification is made (in steps S6 and S7). After the actual camera shake amplitude exceeds the threshold $\alpha T$, damping is made (in steps S6 and S8). The value of T is changed in accordance with the number of recording pixels (in steps S2 and S3). Consequently, the amount of displacement of the extraction frame can be controlled in accordance with the influence of camera shake on the recording image.

Although the embodiment has been described on the case where the user can select one from two types of resolution (number of recording pixels), namely, high-resolution and low resolution, the invention may be also applied to a digital camera in which the user can select one from three or more types of resolution (number of recording pixels). In this case, the step of setting the threshold T in accordance with the number of recording pixels is provided instead of the steps S1, S2 and S3 in FIG. 3.

The invention is useful for a digital camera and a solid-state image pickup unit mounted in a digital camera because camera shake can be grasped easily and intuitively from the display portion.

This application is based on Japanese Patent application JP 2003-292269, filed Aug. 12, 2003, the entire content of which is hereby incorporated by reference, the same as if set forth at length.

[FIG. 1]
1: LENS
3: ACCELERATION SENSOR
4: SIGNAL PROCESSING PORTION
6: MEMORY
8: IMAGE RECORDING DEVICE
9: BUS
10: AMPLITUDE CONTROL PORTION

[FIG. 3]
S1: WHICH IS THE NUMBER OF RECORDING PIXELS, HIGH OR LOW?
S2: DECREASE THE THRESHOLD OF AMPLITUDE.
S3: INCREASE THE THRESHOLD OF AMPLITUDE.
S4: ACCUMULATE VALUES OF THE SENSOR.
S5: IS ONE-IMAGE'S ACCUMULATION COMPLETED?
S6: IS THE AMPLITUDE LARGER THAT THE THRESHOLD BECAUSE OF ZOOMING?
S7: PERFORM CORRECTION TO AMPLIFY THE AMOUNT OF DISPLACEMENT.
S8: PERFORM CORRECTION TO DAMP THE AMOUNT OF DISPLACEMENT.
S9: DECIDE THE POSITION OF EXTRACTION OF CCD.
S10: READ DATA FROM CCD.

What is claimed is:

1. A digital camera comprising:
   a solid-state image pickup device having an image pickup region;
   a signal processing unit for generating a through-image on a basis of an image signal read from a region extracted from a through-image extraction frame of said image pickup region;
   a display unit for displaying said through-image generated by said signal processing unit;
   a camera shake detection unit for detecting an amount of camera shake; and
   a control unit for calculating an amount of displacement by amplifying said amount of camera shake detected by said camera shake detection unit and shifting said through-image extraction frame on a basis of said amount of displacement so that the through-image is displayed on the displaying unit in a state in which blurring of the through-image is recognized visually by a user of the digital camera.

2. The digital camera according to claim 1, wherein said control unit adjusts the calculated amount of displacement in accordance with a zoom ratio of a zoom lens provided in front of said solid-state image pickup device.

3. The digital camera according to claim 2, wherein said control unit adjusts the calculated amount of displacement so that an amount of correction decreases as said zoom ratio increases.

4. The digital camera according to claim 2, wherein said control unit adjusts the calculated amount of displacement so that said amount of displacement is kept constant regardless of said zoom ratio.

5. The digital camera according to claim 1, wherein said control unit adjusts the calculated amount of displacement in accordance with a number of recording pixels.

6. The digital camera according to claim 2, wherein said control unit adjusts the calculated amount of displacement in accordance with a number of recording pixels.

7. The digital camera according to claim 3, wherein said control unit adjusts the calculated amount of displacement in accordance with a number of recording pixels.

8. The digital camera according to claim 4, wherein said control unit adjusts the calculated amount of displacement in accordance wit a number of recording pixels.

9. The digital camera according to claim 5, wherein said control unit adjusts the calculated amount of displacement so that an amount of displacement decreases as said number of recording pixels decreases.

10. The digital camera according to claim 6, wherein said control unit adjusts the calculated amount of displacement so that an amount of displacement decreases as said number of recording pixels decreases.

11. The digital camera according to claim 7, wherein said control unit adjusts the calculated amount of displacement so that an amount of displacement decreases as said number of recording pixels decreases.

12. The digital camera according to claim 8, wherein said control unit adjusts the calculated amount of displacement so that an amount of displacement decreases as said number of recording pixels decreases.

13. The digital camera according to claim 1, wherein said control unit adjusts the calculated amount of displacement by amplification before said amount of camera shake exceeds a predetermined threshold but adjusts the calculated amount of displacement by damping after said amount of camera shake exceeds said predetermined threshold.

14. The digital camera according to claim 13, wherein said control unit sets said predetermined threshold in accordance with a zoom ratio of a zoom lens provided in front of said solid-state image pickup device.

15. A solid-state image pickup unit comprising a solid-state image pickup device defined in claim 1, and a control unit defined in claim 1, wherein said solid-state image pickup device and said control unit are formed on one chip.

* * * * *